(12) United States Patent
Goto

(10) Patent No.: US 10,821,420 B2
(45) Date of Patent: Nov. 3, 2020

(54) HONEYCOMB FILTER

(71) Applicant: IBIDEN CO., LTD., Ogaki (JP)

(72) Inventor: Shinnosuke Goto, Ibi-gun (JP)

(73) Assignee: IBIDEN CO., LTD., Ogaki (JP)

(*) Notice: Subject to any disclaimer, the term of this patent is extended or adjusted under 35 U.S.C. 154(b) by 0 days.

(21) Appl. No.: 16/491,147

(22) PCT Filed: Mar. 5, 2018

(86) PCT No.: PCT/JP2018/008387
§ 371 (c)(1),
(2) Date: Sep. 4, 2019

(87) PCT Pub. No.: WO2018/164069
PCT Pub. Date: Sep. 13, 2018

(65) Prior Publication Data
US 2019/0388873 A1    Dec. 26, 2019

(30) Foreign Application Priority Data

Mar. 6, 2017 (JP) ................ 2017-041790

(51) Int. Cl.
*B01J 21/04* (2006.01)
*B01J 23/10* (2006.01)
(Continued)

(52) U.S. Cl.
CPC .......... *B01J 23/63* (2013.01); *B01D 39/2027* (2013.01); *B01D 46/247* (2013.01); *B01D 53/94* (2013.01);
(Continued)

(58) Field of Classification Search
CPC ... B01J 21/04; B01J 23/10; B01J 23/38; B01J 23/63; B01J 35/04; C04B 35/488;
(Continued)

(56) References Cited

U.S. PATENT DOCUMENTS 5,139,992 A * 8/1992 Tauster ............... B01D 53/945
423/213.5
5,266,548 A * 11/1993 Koradia ............... B01D 53/945
502/439
(Continued)

FOREIGN PATENT DOCUMENTS

JP  2011-183360   9/2011
JP  2013-517934   5/2013
(Continued)

OTHER PUBLICATIONS

International Search Report for corresponding International Application No. PCT/JP2018/008387, dated May 29, 2018.
(Continued)

*Primary Examiner* — Cam N. Nguyen
(74) *Attorney, Agent, or Firm* — Mori & Ward, LLP

(57) ABSTRACT

Disclosed is a honeycomb filter for collecting fine particles that includes a wall portion formed from a base material containing ceria-zirconia composite oxide and an inorganic binder. In a pore diameter distribution in which a pore diameter and a log differential pore volume measured through mercury porosimetry are respectively represented by a horizontal axis and a vertical axis, the wall portion has a peak in a range in which the pore diameter is greater than or equal to 0.01 μm and less than 1 μm and a peak in a range in which the pore diameter is greater than or equal to 1 μm and less than or equal to 50 μm.

6 Claims, 3 Drawing Sheets

(51) Int. Cl.
| | |
|---|---|
| *B01J 23/38* | (2006.01) |
| *B01J 23/63* | (2006.01) |
| *B01J 35/04* | (2006.01) |
| *C04B 35/488* | (2006.01) |
| *B01D 39/20* | (2006.01) |
| *B01D 46/24* | (2006.01) |
| *F01N 3/022* | (2006.01) |
| *F01N 3/28* | (2006.01) |
| *B01D 53/94* | (2006.01) |
| *B01J 23/46* | (2006.01) |

(52) U.S. Cl.
CPC ............ *B01J 21/04* (2013.01); *B01J 23/464* (2013.01); *B01J 35/04* (2013.01); *C04B 35/488* (2013.01); *F01N 3/0222* (2013.01); *F01N 3/281* (2013.01); *B01D 2046/2481* (2013.01); *B01D 2255/9155* (2013.01); *B01D 2255/9202* (2013.01); *B01D 2279/30* (2013.01)

(58) Field of Classification Search
CPC . B01D 39/2027; B01D 46/247; F01N 3/0222; F01N 3/281
See application file for complete search history.

(56) References Cited

U.S. PATENT DOCUMENTS

| | | | | |
|---|---|---|---|---|
| 5,491,120 A * | 2/1996 | Voss | ................ | B01J 37/0244 502/304 |
| 5,935,897 A * | 8/1999 | Trubenbach | ............ | C07C 37/07 502/150 |
| 5,935,898 A * | 8/1999 | Trubenbach | ............ | B01J 35/10 502/150 |
| 7,041,622 B2 * | 5/2006 | Nunan | ................ | B01J 23/63 502/327 |
| 7,214,643 B2 * | 5/2007 | Yamamoto | ............ | C01G 25/00 423/592.1 |
| 7,250,385 B1 * | 7/2007 | Ohno | ................ | B01D 53/945 502/178 |
| 7,517,830 B2 * | 4/2009 | Nomura | ................ | F01N 3/035 502/302 |
| 7,524,350 B2 * | 4/2009 | Kunieda | ............ | B01D 39/2075 428/312.8 |
| 7,722,829 B2 * | 5/2010 | Punke | ................ | B01J 23/42 422/180 |
| 7,731,774 B2 * | 6/2010 | Ohno | ................ | B01D 46/2429 502/439 |
| 7,875,250 B2 * | 1/2011 | Nunan | ................ | B01D 53/945 422/168 |
| 7,947,238 B2 * | 5/2011 | Deeba | ................ | B01D 53/944 423/213.2 |
| 8,283,282 B2 * | 10/2012 | Noguchi | ............ | B01D 46/2429 502/439 |
| 8,409,519 B2 * | 4/2013 | Watanabe | ............ | B01D 53/945 422/180 |
| 8,455,391 B2 * | 6/2013 | Hanaki | ................ | B01D 53/944 502/304 |
| 8,956,994 B2 * | 2/2015 | Ifrah | ................ | B01D 53/9413 502/100 |
| 9,057,310 B2 * | 6/2015 | Bergeal | ................ | B01J 23/44 |
| 9,327,239 B2 * | 5/2016 | Morgan | ............ | B01D 53/9454 |
| 9,347,349 B2 * | 5/2016 | Blakeman | ............ | F01N 13/009 |
| 9,366,166 B2 * | 6/2016 | Blakeman | ........... | B01D 53/9445 |
| 9,387,461 B2 * | 7/2016 | Wu | ................ | B01D 53/945 |
| 9,527,034 B2 * | 12/2016 | Bergeal | ................ | B01J 37/0205 |
| 9,527,035 B2 * | 12/2016 | Bergeal | ................ | B01J 21/12 |
| 10,060,312 B2 * | 8/2018 | Suzawa | ................ | F01N 3/0821 |
| 10,232,348 B2 * | 3/2019 | Wu | ................ | B01J 23/10 |
| 10,286,392 B2 * | 5/2019 | Kobayashi | ............ | F01N 3/035 |
| 10,384,954 B2 * | 8/2019 | Ifrah | ................ | C01F 17/32 |
| 10,472,290 B2 * | 11/2019 | Goto | ................ | B01J 23/10 |
| 2001/0026838 A1 * | 10/2001 | Dettling | ................ | B01J 23/63 427/230 |
| 2003/0061860 A1 * | 4/2003 | Hu | ................ | B01D 53/9454 73/23.31 |
| 2006/0292393 A1 * | 12/2006 | Kunieda | ................ | B01J 35/04 428/688 |
| 2007/0204580 A1 | 9/2007 | Kunieda | | |
| 2008/0317999 A1 * | 12/2008 | Patchett | ............ | B01D 53/9418 428/116 |
| 2009/0041645 A1 * | 2/2009 | Wassermann | .......... | B01J 21/066 423/213.5 |
| 2009/0238733 A1 * | 9/2009 | Ohno | ................ | B01D 46/2429 422/180 |
| 2009/0291839 A1 * | 11/2009 | Kunieda | ............ | B01D 46/2429 502/74 |
| 2009/0298673 A1 * | 12/2009 | Akamine | ................ | B01J 21/066 502/65 |
| 2010/0166629 A1 * | 7/2010 | Deeba | ................ | B01D 53/944 423/213.5 |
| 2011/0107752 A1 * | 5/2011 | Galligan | ............ | B01D 53/945 60/299 |
| 2011/0224069 A1 | 9/2011 | Goto et al. | | |
| 2012/0117953 A1 | 5/2012 | Andersen et al. | | |
| 2013/0336864 A1 * | 12/2013 | Zheng | ................ | B01J 23/63 423/213.5 |
| 2014/0140911 A1 * | 5/2014 | Bergeal | ................ | B01J 35/0006 423/213.5 |
| 2014/0234189 A1 * | 8/2014 | Clowes | ................ | B01J 35/04 423/213.5 |
| 2014/0369912 A1 * | 12/2014 | Zheng | ................ | B01J 23/63 423/213.5 |
| 2017/0314448 A1 * | 11/2017 | Brown | ................ | B01J 23/60 |
| 2018/0361299 A1 * | 12/2018 | Ingram-Ogunwumi | ................ | B01D 46/2425 |
| 2018/0363523 A1 * | 12/2018 | Ingram-Ogunwumi | ................ | B01D 46/2425 |

FOREIGN PATENT DOCUMENTS

| | | |
|---|---|---|
| JP | 2015-85241 | 5/2015 |
| JP | 2016-169127 | 9/2016 |
| JP | 2017-6827 | 1/2017 |
| WO | WO 2006/041174 | 4/2006 |

OTHER PUBLICATIONS

Written Opinion for corresponding International Application No. PCT/JP2018/008387, dated May 29, 2018.

* cited by examiner

HONEYCOMB FILTER

TECHNICAL FIELD

The present invention relates to a honeycomb filter used to collect fine particles.

BACKGROUND

Patent Document 1 discloses a honeycomb filter that is formed from silicon carbide and used to collect fine particles. Patent Document 2 discloses an exhaust gas purification catalyst in which a noble metal is supported by a monolith base material including ceria-zirconia composite oxide particles. The ceria-zirconia composite oxide particles, which form the base material, reduce the thermal capacity of the base material so that the temperature of the monolith base material can easily be increased. This improves the warm-up performance of the catalyst.

PRIOR ART LITERATURE

Patent Literature

Patent Document 1: International Patent Publication No. 2006/041174
Patent Document 2: Japanese Laid-Open Patent Publication No. 2015-85241

SUMMARY OF THE INVENTION

Problem to be Solved by the Invention

In order to improve the warm-up performance of the honeycomb filter disclosed in Patent Document 1, the base material including ceria-zirconia composite oxide particles disclosed in Patent Document 2 could be employed as a wall portion of the honeycomb filter. However, the base material including ceria-zirconia composite oxide particles disclosed in Patent Document 2 is not suitable for the wall portion of the honeycomb filter for collecting fine particles because the wall portion does not allow the passage of gas including fine particles. The recrystallization of silicon carbide particles form pores between particles. However, ceria-zirconia composite oxide particles are bonded by an inorganic binder. Thus, suitable-sized pores for the passage of gas cannot be formed between particles. Further, the wall portion formed from a base material of, for example, silicon carbide can be coated by ceria-zirconia composite oxide. However, in this case, the supported amount of ceria-zirconia composite oxide will be limited to a range that can be coated on the wall portion. This will adversely affect the exhaust gas purification performance. Moreover, a structure coating the base material will increase the weight of the honeycomb filter thereby lowering the warm-up performance. Accordingly, it is an objective of the present invention to provide a honeycomb filter that has superior warm-up performance.

Means for Solving the Problem

A honeycomb filter that solves the above problem is to be used for collecting fine particles and includes a wall portion formed from a base material containing ceria-zirconia composite oxide and an inorganic binder. In a pore diameter distribution in which a pore diameter and a log differential pore volume measured through mercury porosimetry are respectively represented by a horizontal axis and a vertical axis, the wall portion has a peak in a range in which the pore diameter is greater than or equal to 0.01 μm and less than 1 μm and a peak in a range in which the pore diameter is greater than or equal to 1 μm and less than or equal to 50 μm.

With this structure, the honeycomb filter includes the wall portion formed from the base material containing ceria-zirconia composite oxide. Thus, as long as the contents of ceria-zirconia composite oxide are the same, the thermal capacity of the wall portion is smaller than when coating the wall portion, which is formed from a base material of, for example, silicon carbide, with ceria-zirconia composite oxide. Further, the gas subject to treatment is efficiently diffused in the interior of the wall portion through the pores of which the peak is in the range 0.01 μm or greater and less than 1 μm. This improves the purification of the gas diffused in the interior of the wall portion. Furthermore, the pores of which the peak is in the range 1 μm or greater and 50 μm or less improve the gas permeability of the wall portion. This keeps the pressure loss low while maintaining functionality as a filter that collects fine particles. Here, "warm-up performance" indicates how easily the temperature of the honeycomb filter is increased to obtain a suitable gas purification performance. Thus, when a honeycomb filter has a small weight per unit volume and a high purification performance like the honeycomb filter of the present invention, "warm-up performance" will be satisfactory.

In the honeycomb filter of the present invention, it is preferred that the wall portion include linear pores that extend through the wall portion and have a diameter of 1 μm or greater and 50 μm or less. With this structure, the gas easily passes through the wall portion through the pores extending through the wall portion. This increases the gas permeability of the wall portion.

It is preferred that the base material of the honeycomb filter of the present invention contains alumina as a component. With this structure, the base material contains alumina as a component so that a catalyst is thoroughly dispersed when supported by the base material. This improves the performance for purifying the gas subject to treatment. Further, the mechanical strength of the wall portion under a high temperature is increased.

In the honeycomb filter of the present invention, it is preferred that a catalyst be supported by the base material. With this structure, the honeycomb filter has the functions for collecting fine particles as well as a catalyst-based function such as the effect for purifying the gas subject to treatment.

In the honeycomb filter of the present invention, it is preferred that the catalyst be a noble metal. The ceria-zirconia composite oxide functions as an auxiliary catalyst that enhances the catalysis effect of a catalyst formed of a noble metal. Thus, the honeycomb filter of the present invention provides a high catalyst effect when combined with a catalyst formed of a noble metal.

It is preferred that the honeycomb filter of the present invention be partitioned by the wall portion and include a plurality of cells that extend from a first end, which is located at one end side of the honeycomb filter, to a second end, which is located at the other end side of the honeycomb filter. It is preferred that the cells include a first cell, second cell, and third cell. The first cell has an open end located at the first end and a sealed end located at the second end. The second cell is adjacent to the first cell and has a sealed end located at the first end and an open end located at the second end. The third cell is adjacent to at least one of the first cell and the second cell and has open ends located at both the first end and the second end. With this structure, fine particles can be collected in the wall portion between the first cells and the second cells. Further, the third cells, which has open ends located at both the first end and the second end, decrease the pressure loss of the honeycomb filter.

Effect of the Invention

The present invention succeeds in providing a honeycomb filter that has superior warm-up performance.

MODES FOR CARRYING OUT THE INVENTION

One embodiment of the present invention will now be described.

Figure 1:
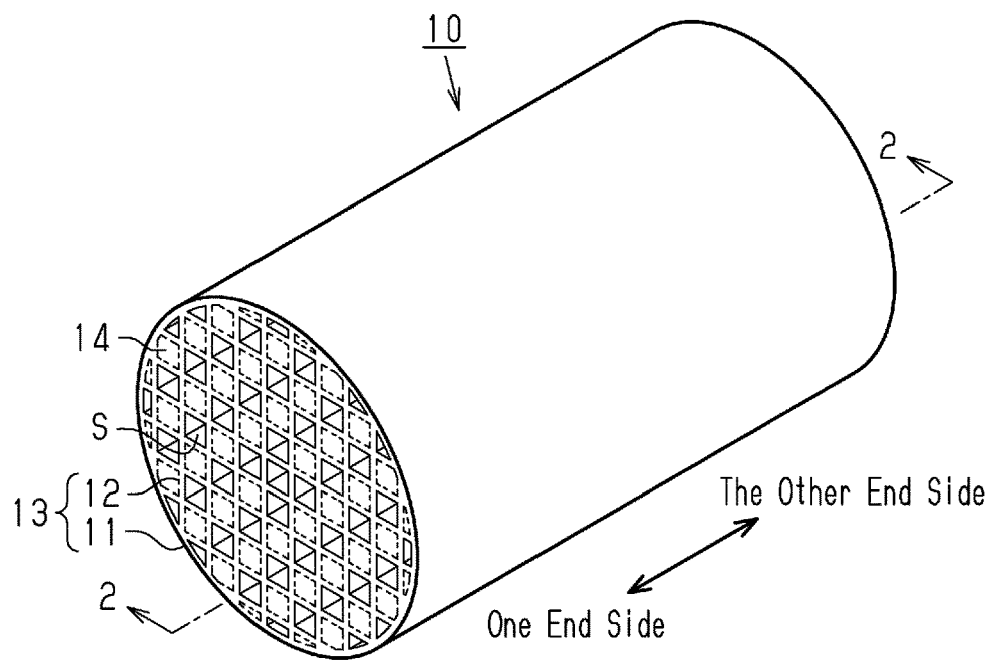
FIG. 1 is a perspective view of a honeycomb filter.

As shown in FIG. 1, a honeycomb filter 10 of the present embodiment includes a cylindrical circumferential wall 11 and partition walls 12 forming a honeycomb-shaped cross-section and partitioning the inside of the circumferential wall 11 into a plurality of cells S. Each cell S extends from one axial end side to the other axial end side of the circumferential wall 11, that is, each cell S extends from a first end, which is located at one end side of the honeycomb filter 10, to a second end, which is located at the other end side of the honeycomb filter 10. The circumferential wall 11 and the partition walls 12 form a wall portion 13. The cell structure of the honeycomb filter 10 is not particularly limited. For example, the partition walls 12 may have a thickness of 0.1 to 0.7 mm and a cell density of 15.5 to 124 cells per 1 cm'. Here, "0.1 to 0.7 mm" means "greater than or equal to 0.1 mm and less than or equal to 0.7 mm", and "15.5 to 124 cells" means "greater than or equal to 15.5 cells and less than or equal to 124 cells". That is, in the present specification, "A to B" refers to "greater than or equal to A and less than or equal to B".

The wall portion 13 is formed from a base material containing ceria-zirconia composite oxide (hereafter, may also be referred to as "CZ composite oxide"), an inorganic binder, and alumina. That is, the base material forming the wall portion 13 includes CZ composite oxide, an inorganic binder, and alumina. A catalyst is supported on surfaces of the particles that form the base material.

The CZ composite oxide forming the base material of the honeycomb filter of the present invention preferably includes 10% by mass or greater of ceria and further preferably 20% by mass or greater of ceria. Moreover, the CZ composite oxide forming the base material of the honeycomb filter of the present invention preferably includes 70% by mass or less of ceria and further preferably 60% by mass or less of ceria. When 10% by mass or greater of ceria is included, the capacity for storing and releasing the oxygen included in the exhaust gas will be increased. Also, when 70% by mass or less of ceria is included, the thermal durability of the honeycomb filter will be increased.

The CZ composite oxide may further include an element selected from rare earth elements excluding cerium. Examples of rare earth elements excluding cerium include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu).

The content of CZ composite oxide in the base material is preferably 15% to 60% by mass.

For example, alumina sol, silica sol, titania sol, liquid glass, sepiolite, attapulgite, bentonite, or boehmite may be used as the inorganic binder. The content of the inorganic binder in the base material is not particularly limited. However, the base material preferably includes 10% to 30% by mass of the inorganic binder.

Preferably, alumina particles are included as the above-mentioned alumina. When the alumina particles are included, for example, a noble metal used as the catalyst will be easily dispersed and supported. Further, the alumina particles increase the mechanical strength of the wall portion 13. The type of the alumina particles is not particularly limited. However, it is preferred that alumina of θ phase (hereafter, also referred to as "θ-alumina") or alumina of γ phase (hereafter, also referred to as "γ-alumina") be used. The θ-alumina limits phase transition even when exposed to a high temperature of approximately 1000° C. Thus, using the θ-alumina as a component of the base material will increase the mechanical strength of the honeycomb filter 10 under a high temperature. The γ-alumina has a large specific surface area so that a noble metal used as the catalyst can be thoroughly dispersed. The content of alumina particles in the base material is not particularly limited. However, the base material preferably includes 15% to 60% by mass of alumina particles.

The base material may include another component in addition to CZ composite oxide, an inorganic binder, and alumina. The other component may be, for example, other inorganic particles having a coefficient of thermal expansion smaller than that of CZ composite oxide and alumina (hereafter, also referred to as "low thermal expansion coefficient particles").

The low thermal expansion coefficient particles included as the other component can lower the coefficient of thermal expansion of the base material. This increases the thermal shock resistance of the honeycomb filter 10. Examples of the low thermal expansion coefficient particles include particles of cordierite, aluminum titanate, and lithium aluminosilicate materials. Examples of lithium aluminosilicate materials include β-spodumene and β-eucryptite. The content of the low thermal expansion coefficient particles is not particularly limited, but the base material preferably includes 5% to 30% by mass of the low thermal expansion coefficient particles.

The catalyst supported by the base material may be a noble metal, an alkali metal (group 1 in periodic table of elements), an alkaline earth metal (group 2 in periodic table of elements), a rare earth element (group 3 in periodic table of elements), or a transition metal element. The catalyst supported by the base material is preferably a noble metal. The noble metal may be, for example, a platinum group metal, such as platinum, palladium, and rhodium. The supported amount of the noble metal is not particularly limited, but it is preferred to support 0.1 to 20 g/L and further preferably 0.5 to 15 g/L of the noble metal relative to the apparent volume (L) of the honeycomb filter 10.

Figure 2:
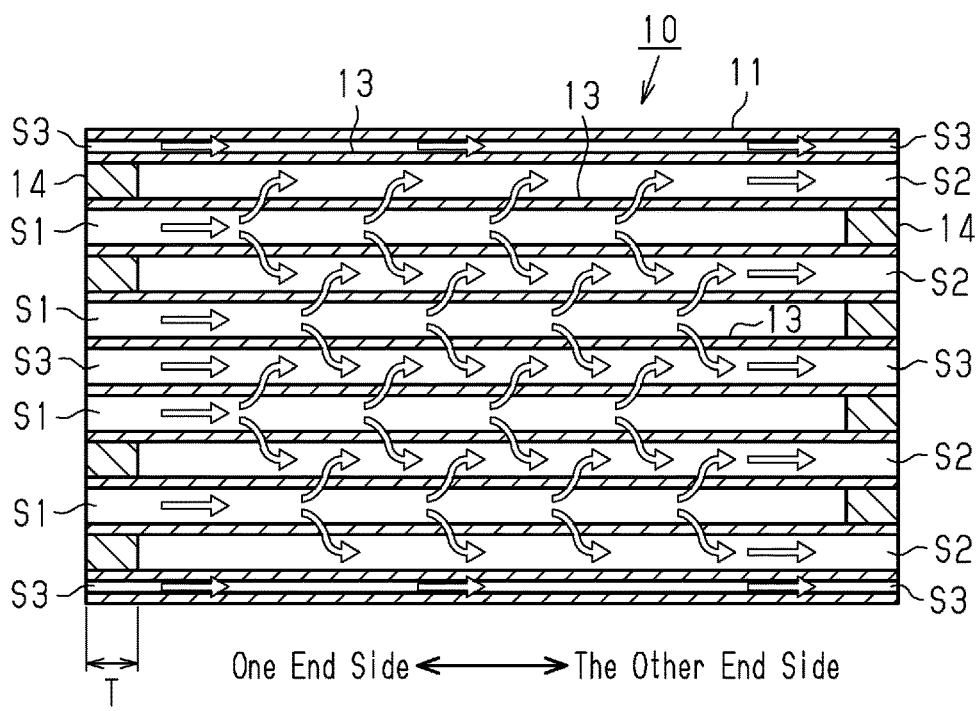
FIG. 2 is a cross-sectional view taken along line 2-2 in FIG. 1.

As shown in FIG. 2, predetermined ones of the cells S each have an end sealed by a seal portion 14. That is, the honeycomb filter 10 includes first cells S1, each of which has an open end located at the first end (one end side) of the honeycomb filter 10 and a sealed end located at the second end (the other end side), and second cells S2, each of which is adjacent to the first cell S1, and has a sealed end located at the first end and an open end located at the second end. The sealed ends of the first cells S1 are located at sides that differ from that of the sealed ends of the second cells S2. Thus, as shown by the arrows in FIG. 2, the gas flowing into the first cells S1 at one end side of the honeycomb filter 10 passes through the interior of the wall portion 13 between the first cells S1 and the second cells S2 and flows into the second cells S2. Then, the gas flows out of the honeycomb filter 10 at the other end side of the honeycomb filter 10. Here, fine particles included in the gas are collected in the surfaces of the wall portion 13 in the first cells S1.

The honeycomb filter 10 may further include third cells S3, each of which is adjacent to at least one of a first cell S1 and a second cell S2 and each of which has two open ends located at both one end side and the other end side of the honeycomb filter 10. That is, some of the cells S may have two open ends. The gas flowing into each cell S3 at one end side of the honeycomb filter 10 passes through the third cell S3 and flows out of the honeycomb filter 10 at the other end side of the honeycomb filter 10. If the third cell S3 is adjacent to a first cell S1, the gas flowing into the first cell S1 at one end side of the honeycomb filter 10 may pass through the interior of the wall portion 13 between the first cell S1 and the third cell S3 and flow into the third cell S3 and then out of the honeycomb filter 10 at the other end side of the honeycomb filter 10.

Each third cell S3 is located at a position selected from a range that is adjacent to at least one of a first cell S1 and a second cell S2. For example, as shown in FIG. 2, the third cell S3 may be the cell S having a relatively small cross-sectional area and located close to the outer circumference of the honeycomb filter 10. Further, the ratio of the number of the third cells S3 to the total number of the cells S is not particularly limited but is preferably ⅓ or less.

Length T of the seal portion 14 shown in FIG. 2 is not particularly limited. However, the length T is preferably greater than the thickness of the partition walls 12. When the thickness of the partition walls 12 is 0.1 to 0.7 mm, the length T of the seal portion 14 is preferably 1 to 10 mm.

The pore diameter distribution of the wall portion 13 of the honeycomb filter 10 will now be described.

Figure 3:
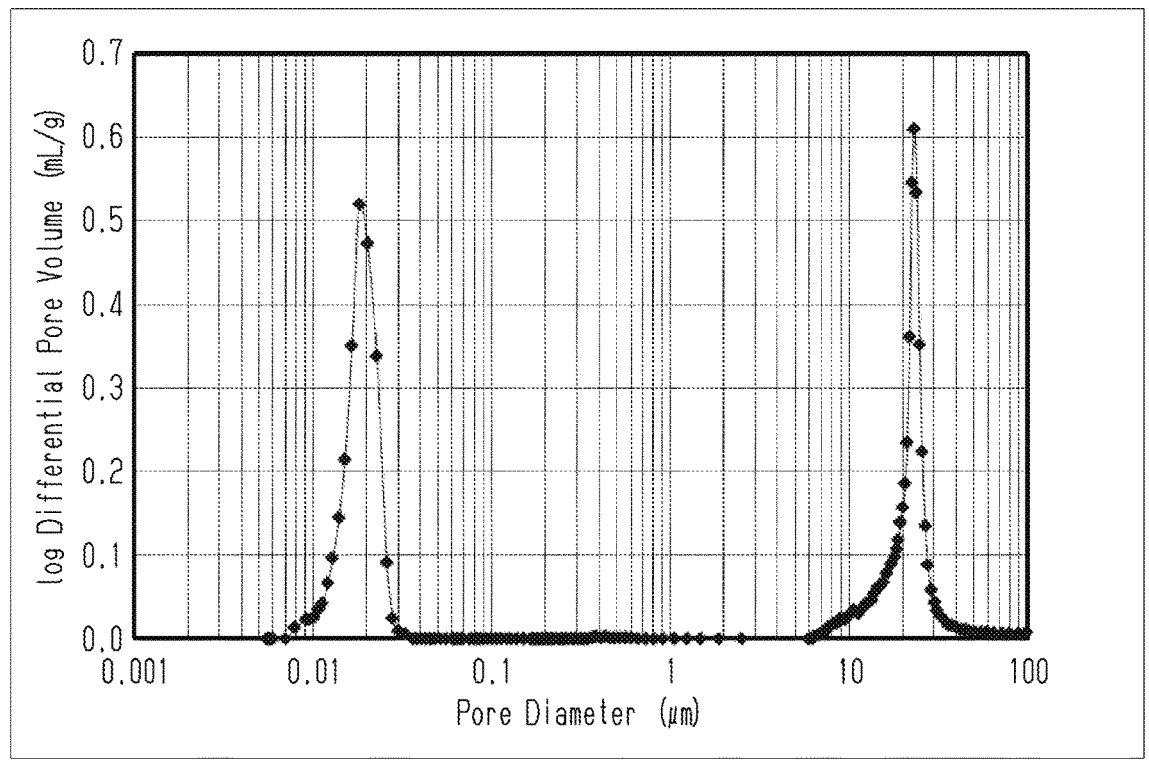
FIG. 3 is a graph showing the pore diameter distribution of a wall portion in an example.

The honeycomb filter 10 of the present embodiment is used to collect fine particles included in the exhaust gas from an internal combustion engine of, for example, a vehicle or a construction machine. Accordingly, the partition walls 12 of the honeycomb filter 10 include pores so that the gas subject to treatment passes through the partition walls 12. The partition walls 12 are a wall portion that has a specified pore diameter distribution. As shown in FIG. 3, when a pore diameter and a log differential pore volume, which are measured through mercury porosimetry, are respectively indicated by a horizontal axis and a vertical axis, the specified pore diameter distribution has a peak in a range in which the pore diameter is greater than or equal to 0.01 μm and less than 1 μm and a peak in a range in which the pore diameter is greater than or equal to 1 μm and less than or equal to 50 μm. The peak in the range in which the pore diameter is greater than or equal to 0.01 μm and less than 1 μm results from the pores formed between the particles of, for example, CZ composite oxide used as a raw material. The number of the peaks in the range in which the pore diameter is greater than or equal to 0.01 μm and less than 1 μm may be one or more.

The peak in the range in which the pore diameter is greater than or equal to 1 μm and less than or equal to 50 μm results from the pores formed by a manufacturing method of the honeycomb filter 10, which will be described later. The pores resulting from the manufacturing method are, for example, formed to be linear, have a diameter of 1 μm or greater and 50 μm or less, and extend through the partition walls 12. The number of the peaks in the range in which the pore diameter is greater than or equal to 1 μm and less than or equal to 50 μm may be one or more. The ratio of the pores in the range in which the pore diameter is greater than or equal to 0.01 μm and less than 1 μm to the pores in the range in which the pore diameter is greater than or equal to 1 μm and less than or equal to 50 μm is not particularly limited, but the volume ratio is preferably 10:1 to 1.5:1.

The linear pores that extend through the partition walls 12 can be recognized by observing a cutaway surface of the partition walls 12 with an electronic microscope. Preferably, 80% or greater of the pores, of which the diameters are greater than or equal to 1 μm and less than or equal to 50 μm, observed with the electronic microscope are linear pores that extend through the partition walls 12. Further, the linear pores may each have the form of any of a straight line, a curved line, or a bent line.

The porosity of the partition walls 12 is not particularly limited but is preferably 40% to 80% and further preferably 55% to 75%. The porosity of the seal portion 14 is not particularly limited but is preferably 40% to 80% and further preferably 55% to 75%. The pore diameter distribution and the porosity of the partition walls 12 can be measured through mercury porosimetry under the condition that a contact angle is 130° and a surface tension is 485 mN/m.

The method for manufacturing the honeycomb filter 10 of the present embodiment will now be described. The honeycomb filter 10 is manufactured by sequentially performing a mixing process, a molding process, a sealing process, a degreasing process, a firing process, and a supporting process as described below.

Mixing Process

The mixing process is a process for preparing a raw material mixture by mixing raw materials such as CZ composite oxide particles, an inorganic binder, alumina particles, and organic fibers. Preferably, a solid solution of ceria and zirconia is used as the CZ composite oxide particles. The solid solution of ceria and zirconium can be prepared, for example, by adding ammonia water to a water solution of a cerium salt, such as cerium nitrate, and zirconium salt, such as zirconium oxynitrate, to generate coprecipitate. The obtained precipitate is dried and then fired at 400° C. to 500° C. for approximately 5 hours.

The average particle size of CZ composite oxide particles, which is one of the raw materials, is not particularly limited. However, the average particle size is preferably 1 to 10 μm and further preferably 1 to 5 μm. The average particle size can be measured with a particle size distribution measurement device of a laser diffraction type.

Any of the above examples of an inorganic binder may be used as the inorganic binder. The ratio of the inorganic binder in the raw material mixture is not particularly limited. However, the ratio is preferably 10% to 30% by mass as a solid content.

As described above, the θ-alumina particles or the γ-alumina particles can be used as the alumina particles. The ratio of the alumina particles in the raw material mixture is not particularly limited. However, the ratio is preferably 10% to 50% by mass as a solid content. The average particle size of the alumina particles is not particularly limited. However, the average particle size is preferably 1 to 10 μm and further preferably 1 to 5 μm as secondary particles.

For example, acrylic fibers or polyester fibers can be used as the organic fibers. The dimension of the organic fiber is not particularly limited, but the diameter is preferably 1 to 50 μm and further preferably 3 to 40 μm. Moreover, the organic fiber preferably has a length of 0.1 to 30 mm and further preferably 0.1 to 10 mm. The ratio of the organic fibers in the raw material mixture is not particularly limited. However, the ratio is preferably 10% to 50% by mass as a solid content.

The above raw material mixture may include the above-described low thermal expansion coefficient particles, inorganic fibers, an organic binder, a pore-forming agent, a molding aid, or a dispersion medium when necessary.

The average particle size of the low thermal expansion coefficient particles is not particularly limited. However, the average particle size is preferably 1 to 10 μm and further preferably 1 to 5 μm.

Examples of the material forming the inorganic fibers include alumina, silica, silica alumina, and a glass.

Examples of the organic binder include methyl cellulose, carboxymethyl cellulose, hydroxyethyl cellulose, polyethylene glycol, phenol resin, and epoxy resin.

The pore-forming agent may be granular, unlike the organic fibers, and examples of such a pore-forming agent includes acrylic resin, coke, and starch.

Examples of the molding aid include ethylene glycol, dextrin, fatty acid, fatty acid soap, polyalcohol, and a surfactant.

Examples of the dispersion medium include water, an organic solvent such as benzene, and an alcohol such as methanol.

These raw materials may be mixed with a known mixer or attritor and may further be kneaded by a kneader.

Molding Process

The molding process is a process for producing a honeycomb molded body by molding the raw material mixture obtained by the mixing process. For example, the raw material mixture is extruded using an extrusion mold and cut into a predetermined length so that the honeycomb molded body has the same form as the honeycomb filter 10 after firing and shrinking is performed in the subsequent firing process. That is, the wall portion 13, which forms the circumferential wall 11 and the partition walls 12 of the honeycomb filter 10, are simultaneously produced through extrusion molding.

Sealing Process

The sealing process is a process for forming the seal portion 14 by filling the ends of the cells S of the honeycomb molded body obtained through the molding process with a sealing material paste. The materials that are the same as the raw material mixture may be used as the sealing material paste. However, it is preferred that organic fibers not be included in the sealing material paste. When organic fibers are not included in the sealing material paste, the porosity of the seal portion 14 can be decreased. The honeycomb molded body of which the seal portion 14 is formed by the sealing process is dried when necessary. The sealing process may be performed subsequent to a degreasing process or a firing process, which will be described below.

Degreasing Process

The degreasing process is a process for producing a degreased body by degreasing the honeycomb molded body that has the seal portion 14. In other words, the degreasing process is a process for removing the organic content from the honeycomb molded body by heating the honeycomb molded body. The elongated organic fibers are removed through the degreasing process so that linear pores can be formed in the wall portion 13. The degreasing process may be performed using a known single furnace, such as a batch furnace, or a continuous furnace. The degreasing temperature is not particularly limited. However, the temperature is preferably 300° C. to 800° C. and further preferably 400° C. to 750° C. The degreasing time is not particularly limited. However, the degreasing is preferably continued for 1 to 10 hours and further preferably 2 to 5 hours at the above-described degreasing temperature. The degreasing environment is not particularly limited, but it is preferred that oxygen concentration be 0.1% to 20%.

Firing Process

The firing process is a process for producing the honeycomb filter 10 by firing the degreased body obtained through the degreasing process. The firing bonds the particles of, for example, CZ composite oxide with the inorganic binder to increase the mechanical strength of the honeycomb filter 10. The firing process may be performed using a known single furnace, such as a batch furnace, or a continuous furnace. The firing temperature is not particularly limited. However, the temperature is preferably 800° C. to 1300° C. and further preferably 900° C. to 1200° C. The firing time is not particularly limited. However, the firing is preferably continued for 1 to 20 hours and further preferably 1 to 15 hours at the above-described firing temperature. The firing environment is not particularly limited, but it is preferred that oxygen concentration be 1% to 20%. The firing process may be performed in a furnace that differs from the one used for the degreasing process, or may be performed successively in the same furnace as the degreasing process. Through the mixing process, molding process, sealing process, degreasing process, and firing process, the honeycomb filter 10 of the present embodiment is produced including the wall portion 13 that has the specified pore diameter distribution and is formed of CZ composite oxide.

Supporting Process

The supporting process is a process for supporting a catalyst in the honeycomb filter 10, which is obtained through the firing process. The catalyst may be supported, for example, through a process in which the honeycomb filter 10 is immersed in a solution including catalyst particles or complexes and pulled out of the solution to be heated. When the catalyst is supported, the wall portion 13 of the honeycomb filter 10 includes a base material containing CZ composite oxide and a catalyst supported by the base material.

The operation and advantages of the present embodiment will now be described.

(1) The honeycomb filter includes a wall portion formed from a base material containing CZ composite oxide and an inorganic binder so that the thermal capacity of the wall portion is smaller than that when the wall portion including a base material of, for example, silicon carbide is coated with CZ composite oxide as long as the contents of CZ composite oxide are the same. Further, the gas subject to treatment is efficiently diffused in the interior of the wall portion through the pores of which the peak is in a range greater than or equal to 0.01 μm and less than 1 μm. This improves the purification of the gas diffused in the interior of the wall portion. Furthermore, the pores of which the peak is in a range greater than or equal to 1 μm and less than or equal to 50 μm increase the gas permeability of the wall portion. This keeps the pressure loss low while maintaining functionality as a filter that collects fine particles.

(2) The wall portion includes linear pores that extend through the wall portion and have a diameter of 1 µm or greater and 50 µm or less. Thus, the gas easily passes through the wall portion through the pores extending through the wall portion. This increases the gas permeability of the wall portion.

(3) The base material of the wall portion contains alumina as a component. Thus, the supported catalyst can be thoroughly dispersed. This improves the purification of the gas subject to treatment. Further, the mechanical strength of the wall portion under a high temperature is increased.

(4) The base material of the wall portion includes a catalyst that is supported by the wall portion. Thus, the honeycomb filter performs the function of collecting fine particles as well as the catalyst-based function such as the effect for purifying the gas subject to treatment.

(5) When the catalyst is a noble metal, the ceria-zirconia composite oxide functions as an auxiliary catalyst that enhances the catalysis effect of the catalyst formed of a noble metal. Thus, the honeycomb filter provides a high catalyst effect.

(6) The honeycomb filter is partitioned by the wall portion and includes a plurality of cells that extend from a first end, which is located at the one end side of the honeycomb filter, to a second end, which is located at the other end side of the honeycomb filter. The cells include first cells, each of which has an open end located at the first end and a sealed end located at the second end, second cells, each of which is adjacent to the first cell and has a sealed end located at the first end and an open end located at the second end, and third cells, each of which is adjacent to at least one of a first cell and a second cell and has two open ends located at both the first end and the second end. Thus, the wall portion between the first cells and the second cells can collect fine particles. Further, the third cells, each of which has two open ends located at both the first end and the second end, decrease the pressure loss of the honeycomb filter.

The present embodiment may be modified as described below. Further, components in the above embodiment and the following modifications may be appropriately combined.

In the present embodiment, the wall portion includes the circumferential wall and partition walls but may only include the partition walls. In this case, the honeycomb filter may be formed by forming an outer coating layer around the outer circumference of the partition walls.

The base material forming the wall portion does not necessarily have to contain alumina as a component. Further, the raw material of the honeycomb filter does not necessarily include alumina particles.

The honeycomb filter does not necessarily have to include the third cells. That is, the honeycomb filter may be structured so that each cell is sealed at one of the two ends. This structure improves the collecting efficiency of the honeycomb filter.

EXAMPLES

An example of the above-described embodiment will now be described.

Example 1

The following raw materials were mixed to prepare a raw material mixture.

CZ composite oxide particles with average particle diameter of 2 µm: 24.0% by mass θ-alumina particles with average particle diameter of 2 µm: 12.0% by mass α-alumina fibers (inorganic fiber) with average fiber diameter of 3 µm and average length of 60 µm: 5.0% by mass Acrylic fibers (organic fibers) with average fiber diameter of 30 µm and average length of 1 mm: 13.0% by mass Boehmite (inorganic binder): 10.0% by mass Methyl cellulose (organic binder): 7.0% by mass Polyoxyethylene oleyl ether (molding aid): 4.0% by mass Ion-exchanged water (dispersion medium): 25.0% by mass The raw material mixture was used to mold a cylindrical molded body with an extrusion apparatus. The molded body was cut into a predetermined length to produce a honeycomb molded body, and the ends of predetermined cells of the honeycomb molded body were sealed with a sealing agent to form seal portions as shown in FIG. 2. The composition of the sealing agent was the same as the above raw materials except that the organic fibers were not included. Further, the length of each seal portion was set to approximately 3 mm. After being dried, the honeycomb molded body was degreased at 700° C. for 3 hours and fired at 1100° C. for 10 hours to produce a honeycomb filter. The obtained honeycomb filter was cylindrical and had a diameter of 117 mm, a length of 80 mm, a cell density of 46 cells/cm$^2$ (300 cpsi), and a wall portion thickness of 0.254 mm (10 mil).

Subsequently, dinitrodiammine palladium nitrate solution ([Pd (NH$_3$)$_2$(NO$_2$)$_2$] HNO$_3$, palladium concentration 100 g/L) and rhodium nitrate solution ([Rd (NO$_3$)$_3$], rhodium concentration 50 g/L) were mixed at a volume ratio of 3:1 to prepare a mixed solution. The honeycomb filter produced through the above processes was immersed and held in the mixed solution for 15 minutes. Then, the honeycomb filter was dried at 110° C. for 2 hours and fired in a nitrogen atmosphere at 500° C. for 1 hour to support a palladium catalyst and a rhodium catalyst in the honeycomb filter. The supported amount of the catalyst was 0.14 g/L in the total of palladium and rhodium per apparent volume of the honeycomb filter.

Comparative Example 1

The honeycomb filter of Comparative Example 1 was produced through the same procedure as Example 1 and with the same mixing ratio although the organic fibers were removed from the raw material.

Comparative Example 2

First, the following raw materials were mixed to prepare a raw material mixture.

Silicon carbide particles with average particle diameter of 15 µm: 28% by mass

Silicon carbide particles with average particle diameter of 0.95 µm: 19% by mass Shirasu balloons with average particle size of 34 µm (pore-forming agent): 9% by mass Starch with average particle size of 28 µm (pore-forming agent): 16% by mass Methyl cellulose (organic binder): 5% by mass Sorbitan fatty acid ester (dispersant): 3% by mass Polyoxyalkylene compound (plasticizer): 2% by mass Water (dispersion medium): 18% by mass The raw material mixture was used to mold a polygonal column-shaped molded body with an extrusion apparatus. The molded body was cut to produce a honeycomb molded body, and the cells in the honeycomb molded body were alternately sealed with a sealing agent having the same composition as the above raw material mixture. The honeycomb molded body was heated at 450° C. for 5 hours in a state in which the honeycomb molded body was placed on a support member, which was a cut-out piece obtained when cutting the honeycomb molded body, to remove the organic content and obtain a degreased body. The degreased body was preserved in an argon atmosphere at 2000° C. for 4.5 hours in a state placed on the support member to obtain a honeycomb fired body. The honeycomb fired body was preserved in a nitrogen atmosphere having the nitrogen partial pressure of 10 kPa at 800° C. for 4.5 hours to perform a nitriding process and obtain a honeycomb structure of which the main component was silicon carbide and of which dimensions was 34.4 mm×34.3 mm×80 mm, cell density was 46.5 cells/cm$^2$ (300 cpsi), and thickness was 0.254 mm. This honeycomb structure had an average pore diameter of 20 µm and a porosity of 60%. This honeycomb structure was bonded by an inorganic adhesive to form an outer circumference and obtain a cylindrical honeycomb structure having a diameter of 117 mm and a length of 80 mm.

Subsequently, the γ-alumina particles, which support palladium, and the CZ composite oxide particles, which support rhodium, were mixed at a ratio of 1:2 and the cylindrical honeycomb structure was wash-coated to produce a honeycomb filter. In this case, the supported amount of the catalyst was set to 0.14 g/L in the total of palladium and rhodium per apparent volume of the honeycomb filter.

Evaluation Tests

The pore diameter distribution, warm-up performance, and pressure loss of the honeycomb filters of the example and comparative examples were measured through the processes described below.

Pore Diameter Distribution Measurement

Figure 4:
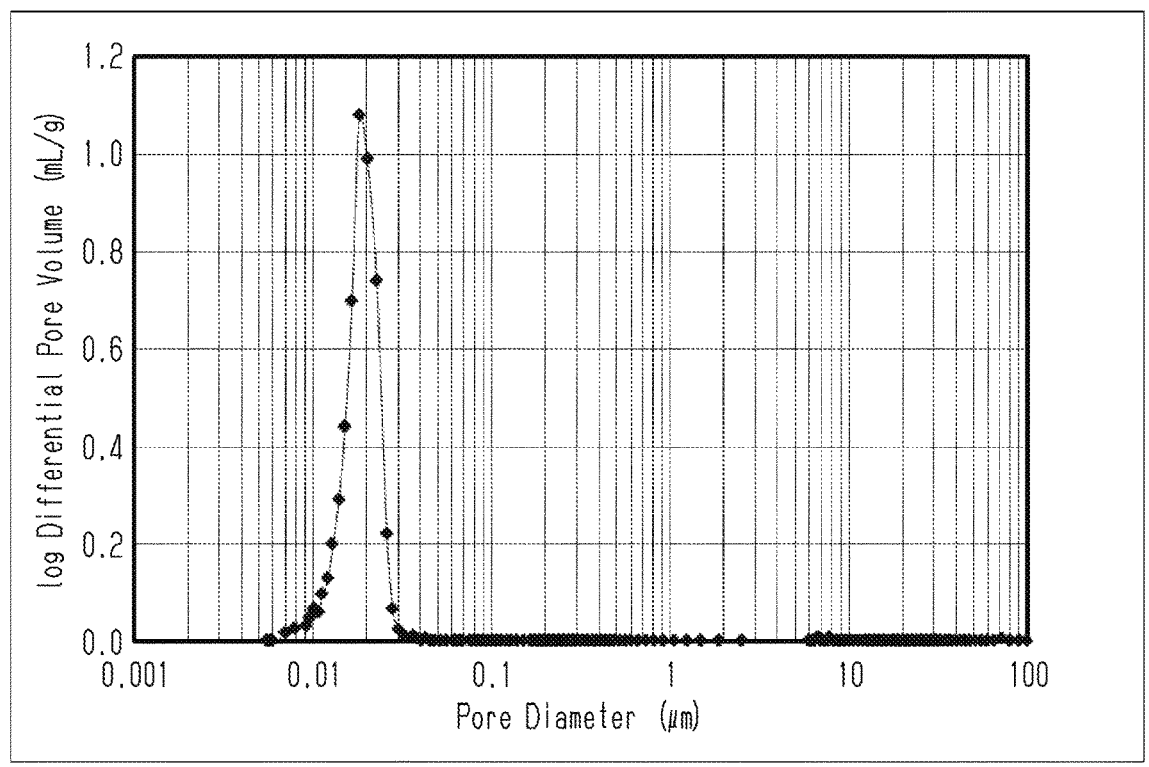
FIG. 4 is a graph showing the pore diameter distribution of a wall portion in a comparative example.

The results of the pore diameter distribution measurement at the wall portions of the honeycomb filters of Example 1 and Comparative Example 1 are each shown in FIGS. 3 and 4. The pore diameter distribution of the wall portion was measured through mercury porosimetry under the condition that a contact angle was 130° and a surface tension was 485 mN/m. The pore diameters are represented by the horizontal axis and the log differential pore volumes are represented by the vertical axis.

As shown in FIG. 3, in Example 1, one peak was in a range in which the pore diameter is greater than or equal to 0.01 µm and less than 1 µm, and one peak was in a range in which the pore diameter is greater than or equal to 1 µm and less than or equal to 50 µm. In contrast, as shown in FIG. 4, in Comparative Example 1, one peak was in the range in which the pore diameter is greater than or equal to 0.01 µm and less than 1 µm, and no peak was in the range in which the pore diameter is greater than or equal to 1 µm and less than or equal to 50 µm.

Warm-Up Performance Measurement

Each honeycomb filter of Example 1 and Comparative Examples 1 and 2 was arranged in a metal pipe in an airtight state and connected to an exhaust pipe of a V-type 3.5 L engine with six cylinders. Then, the time required from a stoichiometric engine start for the HC concentration ((HC flow-in rate−HC flow-out rate)/(HC flow-in rate)×100) to become 50% or less was measured to evaluate the warm-up performance.

Pressure Loss Measurement

Figure 5:
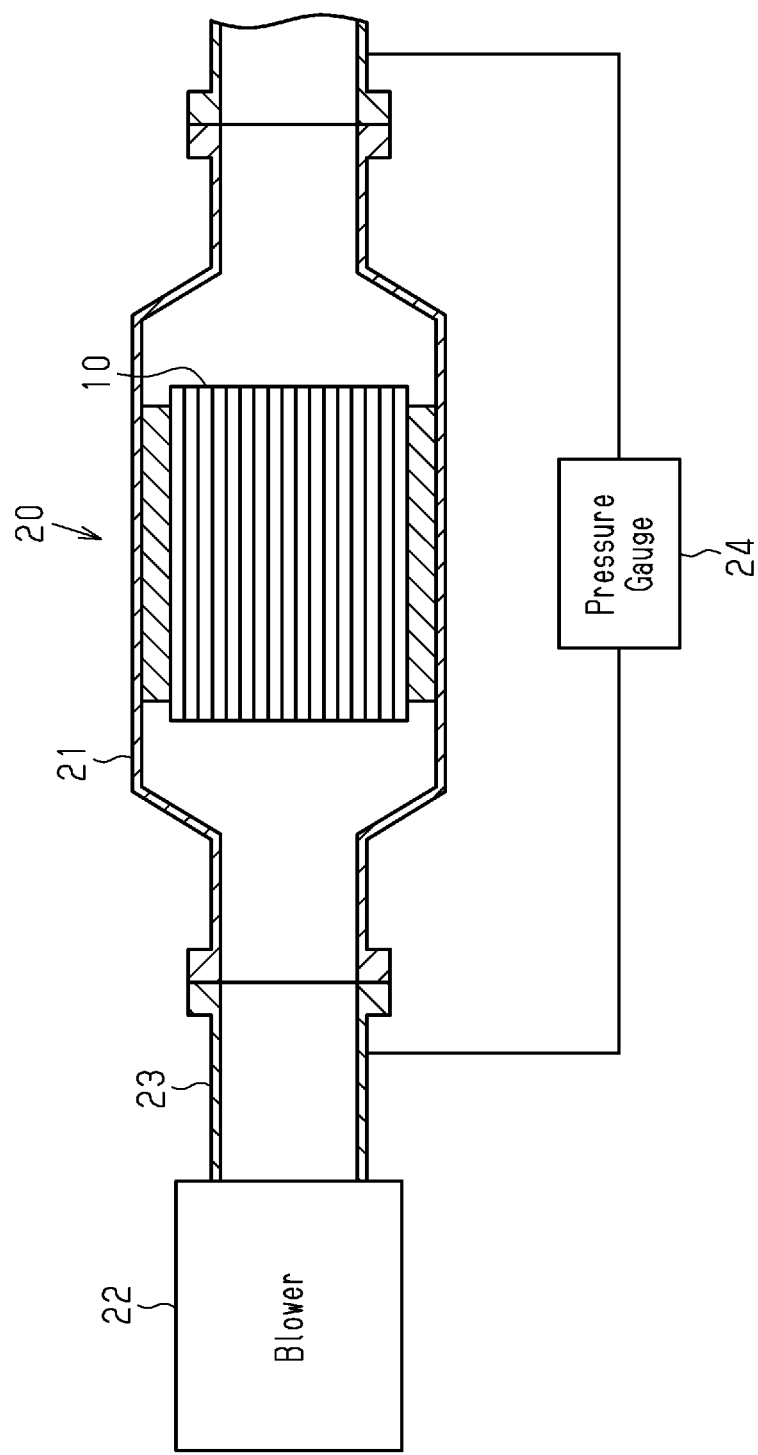
FIG. 5 is a schematic diagram of a pressure loss measuring device.

The pressure loss of the honeycomb filters of Example 1 and Comparative Examples 1 and 2 were measured with a pressure loss measurement device 20 shown in FIG. 5. FIG. 5 is a schematic cross-sectional view illustrating the pressure loss measurement process. First, the honeycomb filter 10 was placed inside a metal pipe 21 in an airtight state. The metal pipe 21 was connected to a metal pipe 23 attached to a blower 22. Then, the blower 22 forced air at a velocity of 10 m/s through the honeycomb filter 10 to measure the difference in pressure (pressure loss) between the front and the rear of the honeycomb filter 10 with a pressure gauge 24.

The results of the warm-up performance measurement and the pressure loss measurement are shown in Table 1.

TABLE 1

| | Time Required to Reach HC Purification Rate 50% (s) | Pressure Loss (kPa) |
|---|---|---|
| Example 1 | 12 | 14.8 |
| Comparative Example 1 | 20 | 52.9 |
| Comparative Example 2 | 25 | 12.5 |

As shown in Table 1, the honeycomb filter of Example 1 required less time for the purification rate of hydrocarbon (HC) to reach 50% than the honeycomb filters of Comparative Examples 1 and 2. Thus, the honeycomb filter of Example 1 has superior warm-up performance. Further, the honeycomb filter of Example 1 showed a pressure loss lower than that of the honeycomb filter of Comparative Example 1. Thus, the honeycomb filter of Example 1 functions as a filter that collects fine particles.

DESCRIPTION OF REFERENCE CHARACTERS 10) honeycomb filter, 11) circumferential wall, 12) partition wall, 13) wall portion, 14) seal portion, S) cell.

The invention claimed is:

1. A honeycomb filter for collecting fine particles, the honeycomb filter comprising:
    a wall portion formed from a base material containing ceria-zirconia composite oxide and an inorganic binder, wherein
    in a pore diameter distribution in which a pore diameter and a log differential pore volume measured through mercury porosimetry are respectively represented by a horizontal axis and a vertical axis, the wall portion has a peak in a range in which the pore diameter is greater than or equal to 0.01 µm and less than 1 µm and a peak in a range in which the pore diameter is greater than or equal to 1 µm and less than or equal to 50 µm,
    the honeycomb filter is partitioned by the wall portion and includes a plurality of cells that extend from a first end, which is located at one end side of the honeycomb filter, to a second end, which is located at the other end side of the honeycomb filter, and
    the cells include
        a first cell that has an open end located at the first end and a sealed end located at the second end, and
        a second cell that is adjacent to the first cell and has a sealed end located at the first end and an open end located at the second end.

2. The honeycomb filter according to claim 1, wherein the wall portion includes linear pores that extend through the wall portion and have a diameter of 1 µm or greater and 50 µm or less.

3. The honeycomb filter according to claim 1, wherein the base material contains alumina as a component.

4. The honeycomb filter according to claim 1, wherein a catalyst is supported by the base material.

5. The honeycomb filter according to claim 4, wherein the catalyst is a noble metal.

6. The honeycomb filter according to claim 1, wherein the cells further include
    a third cell that is adjacent to at least one of the first cell and the second cell and has open ends located at both the first end and the second end.

\* \* \* \* \*